ACCUMULATOR AND FOLDOVER APPARATUS

Inventors
Harvey A. Edmonds
Jack L. Hodsel
Dalbert U. Shefte
Attorney

ACCUMULATOR AND FOLDOVER APPARATUS

Filed June 19, 1957 11 Sheets-Sheet 2

Inventors
Harvey A. Edmonds
Jack L. Hadsel

Dalbert U. Shefte
Attorney

ACCUMULATOR AND FOLDOVER APPARATUS

Filed June 19, 1957 11 Sheets-Sheet 3

Inventors
Harvey A. Edmonds
Jack L. Hodsel
Delbert U. Shifte
Attorney

ACCUMULATOR AND FOLDOVER APPARATUS

Inventors
Harvey A. Edmonds
Jack L. Hadsel
Dallett U. Shefte
Attorney

June 19, 1962 H. A. EDMONDS ET AL 3,039,593

ACCUMULATOR AND FOLDOVER APPARATUS

Filed June 19, 1957 11 Sheets-Sheet 5

Inventors
Harvey A. Edmonds
Jack L. Hadsel
Dalbert U. Shefte
Attorney

June 19, 1962 H. A. EDMONDS ET AL 3,039,593

ACCUMULATOR AND FOLDOVER APPARATUS

Filed June 19, 1957 11 Sheets-Sheet 6

Inventors
Harvey A. Edmonds
Jack L. Hadsel
Delbert U. Shefte
Attorney

ACCUMULATOR AND FOLDOVER APPARATUS

Filed June 19, 1957 11 Sheets-Sheet 7

Inventors
Harvey A. Edmonds
Jack L. Hadsel

Dalbert U. Shefte
Attorney

ACCUMULATOR AND FOLDOVER APPARATUS

Filed June 19, 1957 11 Sheets-Sheet 8

Inventors
Harvey A. Edmonds
Jack L. Hadsel
Dalbert U. Shefte
Attorney

June 19, 1962 H. A. EDMONDS ET AL 3,039,593

ACCUMULATOR AND FOLDOVER APPARATUS

Filed June 19, 1957 11 Sheets-Sheet 9

Inventors
Harvey A. Edmonds
Jack L. Hadsel

Dalbert U. Shefte
Attorney

ACCUMULATOR AND FOLDOVER APPARATUS

Filed June 19, 1957 11 Sheets-Sheet 10

Inventors
Harvey A. Edmonds
Jack L. Hadsel
Dalbert U. Shefte
Attorney

June 19, 1962 H. A. EDMONDS ET AL 3,039,593

ACCUMULATOR AND FOLDOVER APPARATUS

Filed June 19, 1957 11 Sheets-Sheet 11

Inventors
Harvey A. Edmonds
Jack L. Hadsel
By Donald L. Welsh
Attorney

United States Patent Office 3,039,593

Patented June 19, 1962

3,039,593
ACCUMULATOR AND FOLDOVER APPARATUS

Harvey A. Edmonds and Jack L. Hadsel, Chicago, Ill., assignors to Structural Clay Products Research Foundation Filed June 19, 1957, Ser. No. 667,073
11 Claims. (Cl. 198—35)

This invention relates to an accumulator and foldover apparatus and more particularly to an apparatus which accumulates rows of units and subsequently folds one row upon another for discharge as a double tier row.

In the art of automation relating to materials handling and production line operation it is often desired that units moving on a conveyor be accumulated for controlled release so that the units are properly spaced to meet the requirements of subsequent operations.

This general problem has been encountered in the specific case of an automatic production line for the packaging of structural clay products, such as brick and tile. The Structural Clay Products Research Foundation of Geneva, Illinois, has developed a package which facilitates the handling of brick and tile units. This pack is described and disclosed in the United States Letters Patent No. 2,778,491 issued January 22, 1957. In order to commercially utilize this pack the Structural Clay Products Research Foundation has endeavored to develop an automatic production line into which individual units are fed for automatic accumulation, stacking and strapping to form a complete pack ready for transportation to the job site.

A portion of this line is illustrated in FIG. 1 wherein it is seen that a feed conveyor A feeds units onto an accumulator conveyor B, which in turn places single rows of units onto an elevator C. The elevator raises a row of units and releases the row onto a foldover conveyor D. A foldover mechanism E folds over a first row of units onto a second row of units on the foldover conveyor D and this double tier row of units is moved to the end of the foldover conveyor D where a pusher F engages the row and forces it to the next station of the line, which in this case is a strapper H which straps the double tier row to form a pack.

The apparatus of this invention is adapted for use in conjunction with a paper feed mechanism G which feeds a length of paper onto the second row prior to the folding over of the first row. This is required in a brick or tile packaging line wherein one side of each unit has a finished face and it is desired to protect that face by a pad such as a sheet of paper. The present invention is operable to fold a row of units so that the finished face of the row folded will be adjacent the paper, as will the face of the second row.

It is the general object of this invention to provide a new and improved accumulator and foldover apparatus.

Another object of the present invention is to provide a new and improved accumulator and foldover apparatus which receives rows of units and releases said rows for subsequent operation thereon by other apparati.

A further object of the present invention is to provide a new and improved accumulator and foldover apparatus having foldover clamps which turn a row of units over onto a subsequent row of units.

Still another object of the present invention is to provide a new and improved accumulator and foldover apparatus having an elevator which receives a single row of units and rises to discharge that single row onto the subsequent portions of the apparatus.

A still further object of the present invention is to provide a new and improved accumulator and foldover apparatus with an accumulator conveyor having disengageable drive means mechanically interconnected with the releasing elevator.

Yet another object of the present invention is to provide a new and improved accumulator and foldover apparatus wherein the clamping means of the foldover has an initial zero velocity, rotates through a maximum velocity to a zero discharge velocity so as to prevent impact damage to the units operated on.

Further and other objects and features of the present invention will be apparent from the following description and drawings, in which.

Figure 1:
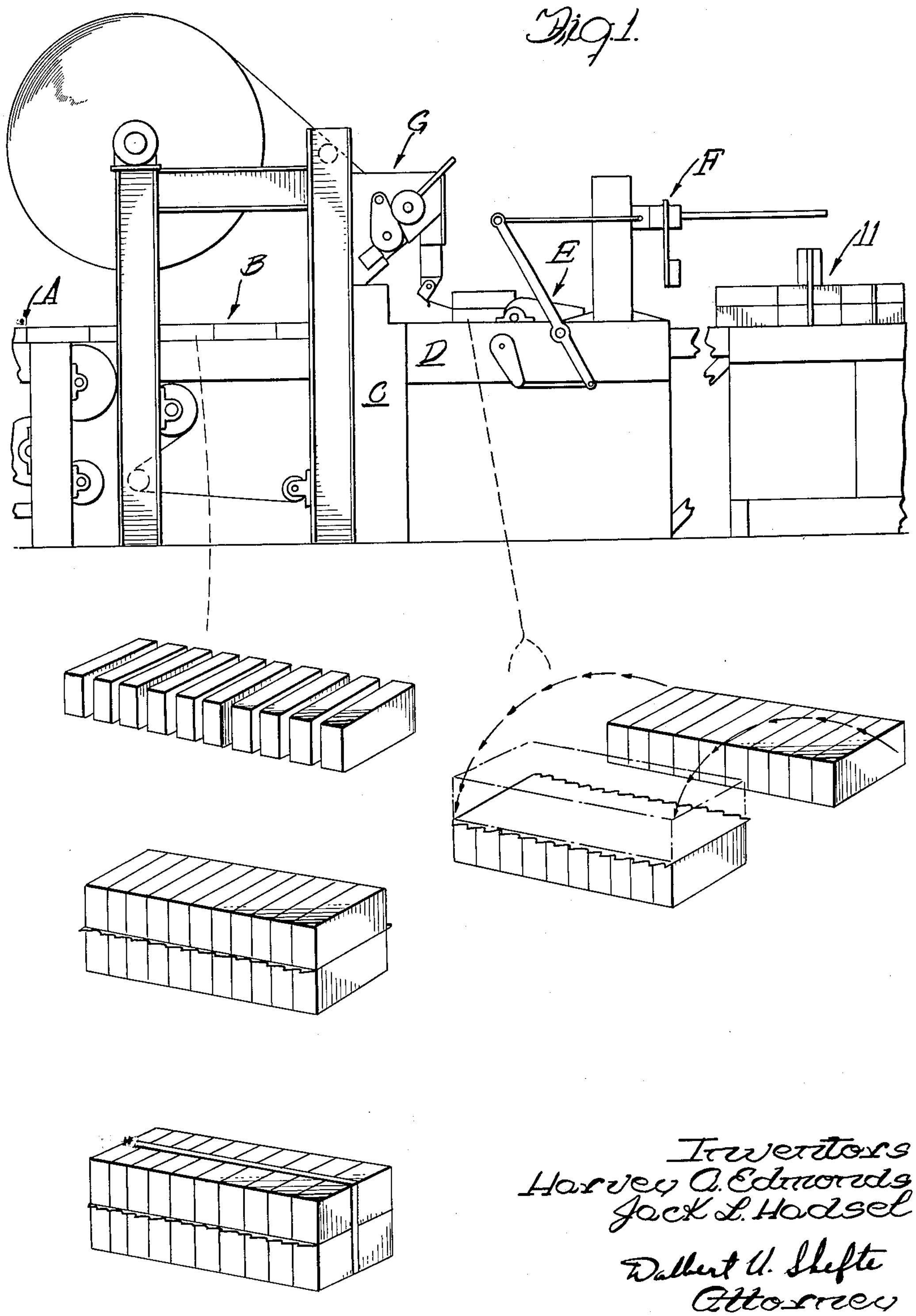
FIG. 1 is a partially diagrammatic view of a portion of a packaging line including an accumulator and foldover apparatus illustrating one embodiment of the present invention.

While this invention is susceptible of embodiments in many different forms, there is shown in the drawings and will herein be described in detail one embodiment, with the understanding that the present disclosure is to be considered as an exemplification of the principles of the invention and is not intended to limit the invention to the embodiment illustrated. The scope of the invention will be pointed out in the appended claims.

Referring now to the figures in detail, it is seen that the accumulator conveyor B, elevator C, foldover conveyor D, foldover mechanism E and pusher F are all interconnected for continuous operation on units moving through the line.

The accumulator conveyor B which receives rows of units from the feed conveyor A is mounted in a framework 10, having a pair of front supports 11 and a pair of rear supports 12. Side pieces 14 extend between and fixedly space the front supports 11 and the rear supports 12 and a plurality of rollers 15 are mounted between the side pieces 14 for free rotation. A drive belt 16 is mounted on guide rollers 18 and a drive roller 20 secured to the framework 10. The drive roller 20 is mounted on a shaft 21 which is powered by a drive motor 22 to impart movement to the belt 16. A tensioning roller 24 is mounted on vertical traverse rods 25, attached to the front supports 11 of the framework 10, and is vertically adjustable to tension the drive belt 16 as desired.

A pivotal carriage 26 is mounted on a shaft 28 secured to and extending between the rear end of the side pieces 14. The forward end of the pivotal carriage 26 is pivotally attached to the ends of links 29. The other ends of the links 29 are pivotally attached to arms 30 of bell cranks 31. These bell cranks are mounted on a shaft 32 having ends mounted in bearings 34 on the front supports 11 of the framework 10. The bell cranks 31 have other arms 35 which are pivotally attached to the side plates 36 on the elevator C so that as the elevator C moves up or down the bell crank operates to pivot the pivotal carriage 26.

The pivotal carriage 26 includes adjustable inner sides 38 which are attached by bolts 42 which extend through slots 41 in the pivotal carriage 26. There are two of these bolt and slot attachments on each side of the pivotal carriage 26. Adjusting screws 39 movable in the pivotal carriage 36 engage the inner sides 38 for raising and lowering the inner sides. Holes 40 are provided in the side pieces 14 adjacent the slots 41 so as to provide easy access to the locking bolts 42 which ride in the slots 41 and are tightened to lock the inner sides 38 with respect to the pivotal carriage 26 after adjustment of the screws 39.

Belt engaging rollers 44 are mounted between the adjustable inner sides 38. These rollers 44 are arranged so that when the pivotal carriage 26 is in the raised position they will press the belt 16 against the conveyor or rollers 15 so as to transmit motion to objects on the accumulator conveyor B. When the pivotal carriage 26 is lowered the belt engaging rollers 44 disengage the belt 16 so that the belt will move away from the conveyor rollers 15 and not transmit motion thereto.

The adjusting screws 39, slots 41 and bolts 42 permit the plane of the belt engaging rollers 44 to be adjusted for wear or other reasons so that an even driving pressure may be exerted by the belt engaging rollers 44.

Referring now to the elevator C, it will be seen that the side plates 36 are joined by a crosspiece 45 to form an H frame. This H frame is movable in a vertical direction, the movement being restricted by the front supports 11 of the accumulator conveyor framework 10 on one side and the frame 46 of the foldover conveyor on the other side. The movement of the elevator is further guided by rods 48 pivotally attached at one end to frame 46 of the foldover conveyor and pivotally connected at the other ends to the side plates 36 of the elevator. These guide rods 48 restrict the movement of the elevator to a slightly arcuate path. However, since the rods 48 are of substantial length and the movement of the elevator is comparatively short, the arcuate path of the elevator will not vary appreciably from a vertical line. Further support for the elevator frame are vertical spring urged rods 49, having ends mounted in stationary brackets 50, secured to and extending between the frame 46 of the foldover conveyor 46 and the front supports 11 of the accumulator conveyor. The rods 48 pass through sleeves 51 mounted on brackets 52 on the side plates 36 of the elevator. Springs 54 are interposed between each sleeve 51 and associated stationary bracket 50. These rods 48 and springs 54 serve to cushion the movement of the elevator C.

The elevator C is raised and lowered by the operation of a cylinder 55 mounted in the foldover frame 46 which forces a piston 56 to operate a bell crank 58 mounted on a shaft 59, extending across the frame 46. One arm 60 of the bell crank 58 is connected to a pivotal link 61 which is connected to the crosspiece 45 of the elevator frame. Thus, when the cylinder 55 forces the piston 56 out of the cylinder, the bell crank is rocked so that the pivotal link 61 will drive the H frame of the elevator C upwardly and similarly when the piston 56 moves back into the cylinder 55 the elevator will be lowered.

Extending across the side plates 36 of the elevator are several rollers 64 which, when the elevator is in the lowered position, are in line with rollers 15 of the accumulator conveyor so that units moving along the accumulator conveyor B will be fed onto the elevator C. Attached across the top of the side plates 36 is a hold-down roller 65 which is adjustably mounted to the side plates in slots 66 to accommodate various size units. This hold-down roller 65 applies sufficient pressure to the unit on the elevator C so that it will not move thereon until the rollers 64 are operated.

The drive for the unit engaging rollers 64 consists of belts 68 which pass over a drive roller 69 mounted in bearings 70 secured to the sides 71 of the foldover conveyor. The drive roller 69 is operated by a drive motor 72 connected by a belt and pulley arrangement 74 to the end of the shaft 75 of the drive roller 69. The belt 68 passes over a roller 76 adjacent the unit engaging roller 64 of the elevator and attached in bearings 78 secured to the side plates 36 of the elevator. The belt 68 also passes over a first guide roller 79, down over a tensioning roller 80 and up over a second guide roller 81. The tensioning roller is mounted on a shaft 82 extending between the side plates 36 of the elevator and having its ends movable in vertical slots 84 in the side paltes 36. Tension bars 85 movably mounted in brackets 86 on the side plates 36 are secured to the shaft 82 of the tensioning roller 80 and springs 88 are interposed between the bracket 86 and shaft 82 urging the tensioning roller 80 downwardly so as to tension the belt 68.

Figure 2:
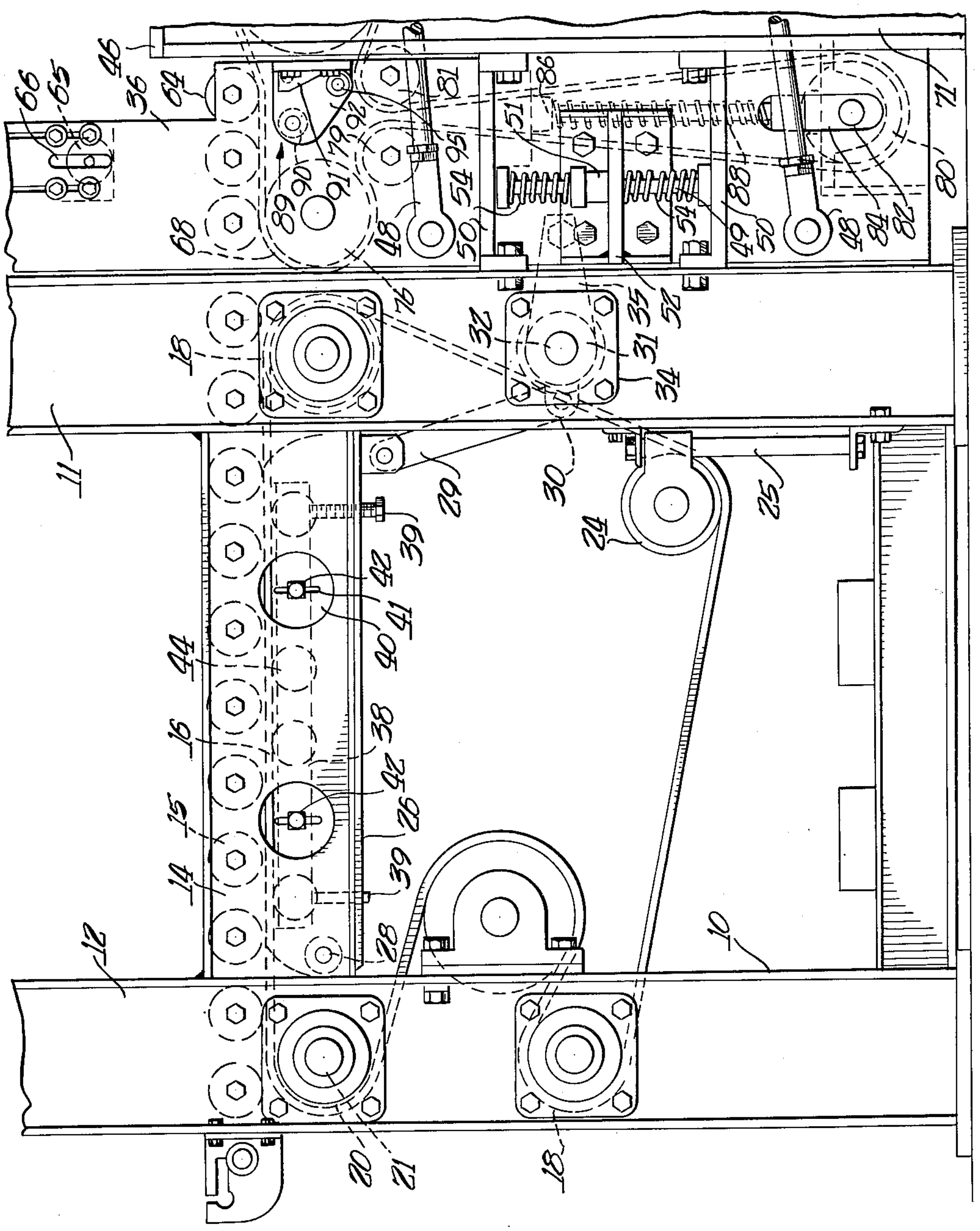
FIG. 2 is a side elevation of a portion of the embodiment of the accumulator and foldover apparatus described herein and showing the elevator in lowered position.
Figures 3, 4:
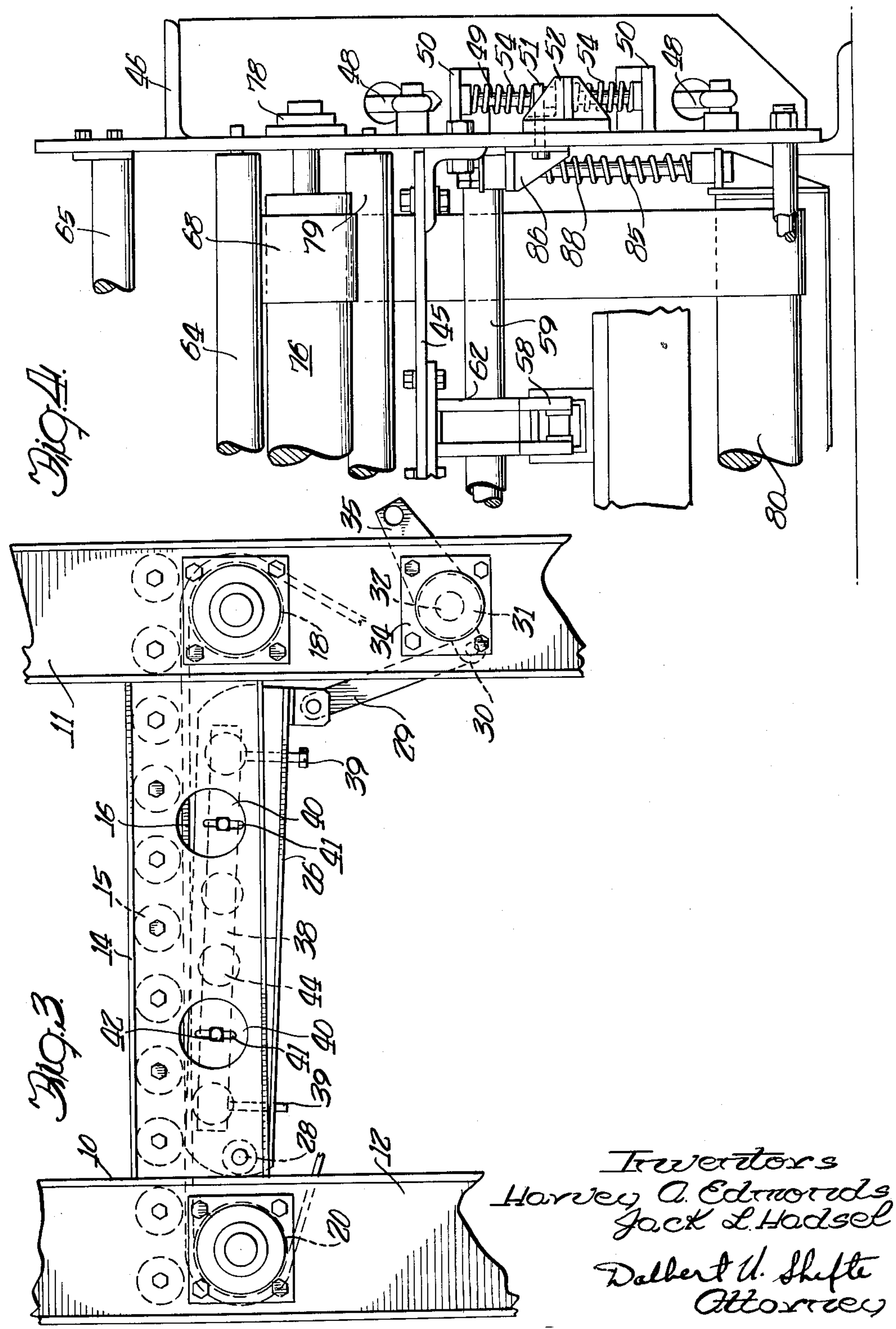
FIG. 3 is a view similar to FIG. 2 showing a portion of the structure and illustrating the position of the elements with the elevator in the raised position.
FIG. 4 is a partial rear elevational view of the elevator portion of FIGS. 2 and 3.
Figure 5:
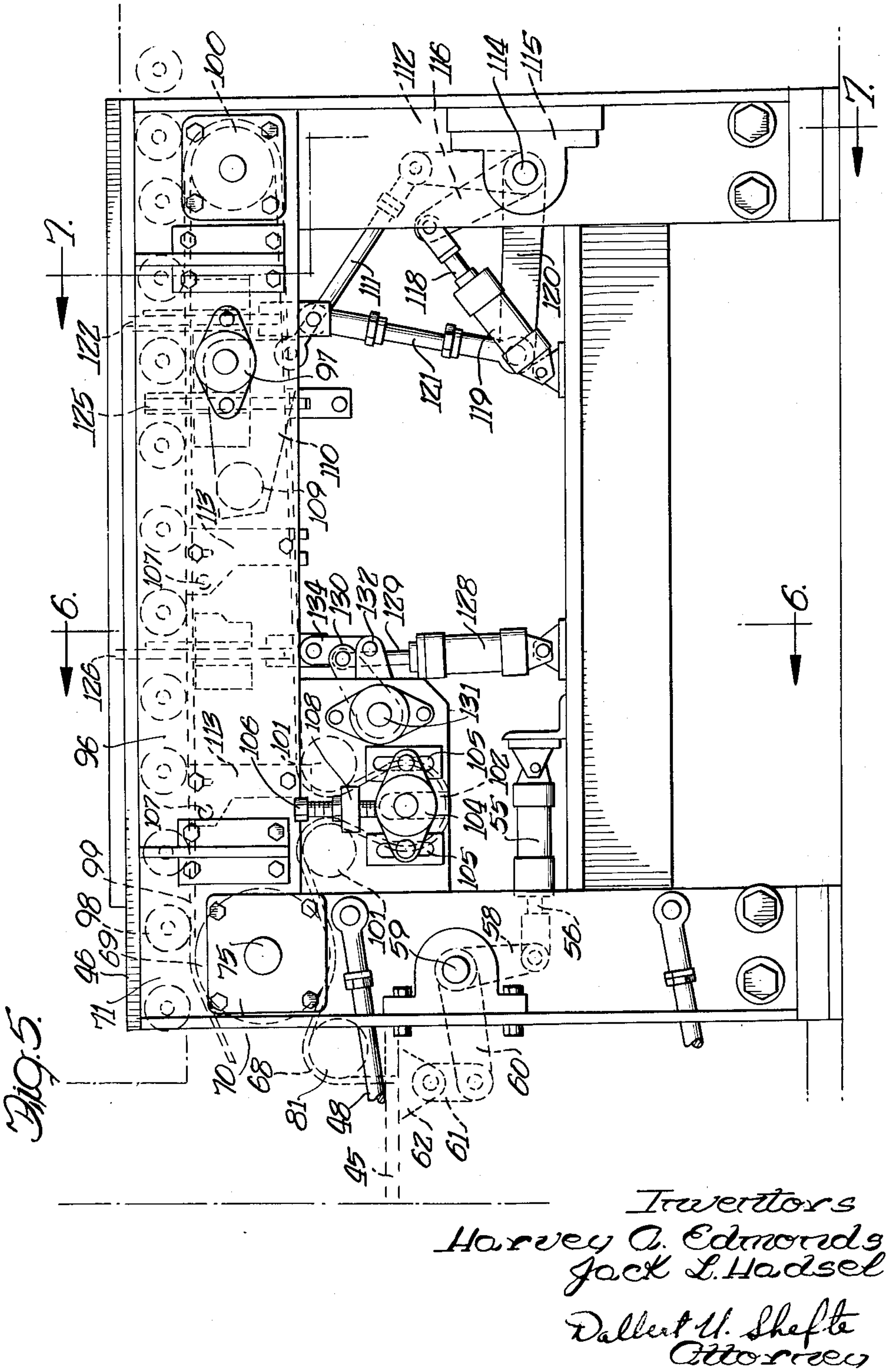
FIG. 5 is a side elevation of the foldover conveyor, foldover arms and pusher of the embodiment described with the foldover drive mechanism not shown.
Figure 6:
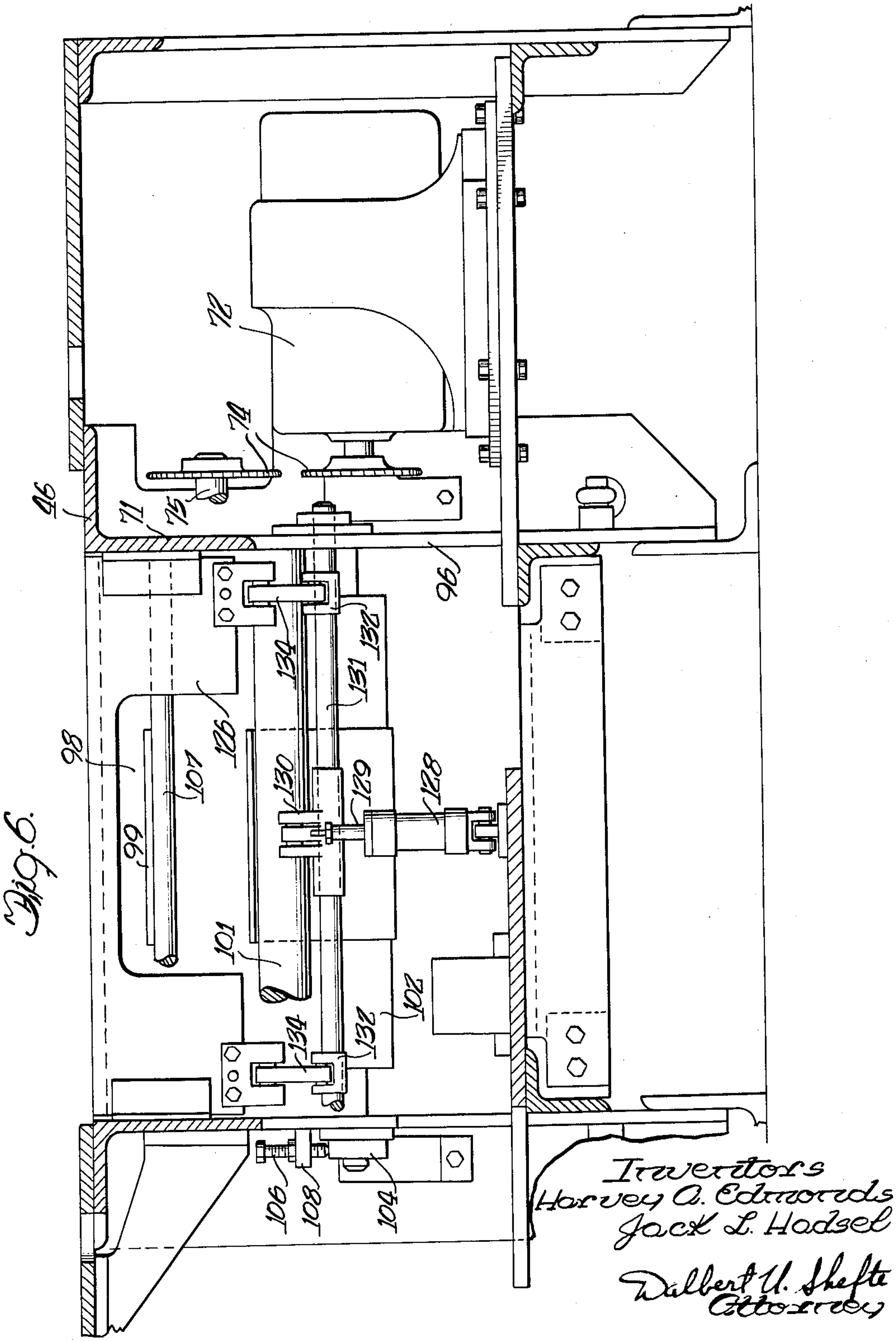
FIG. 6 is a vertical sectional view taken along line 6—6 of FIG. 5 and including the foldover drive mechanism.
Figures 12, 13, 14:
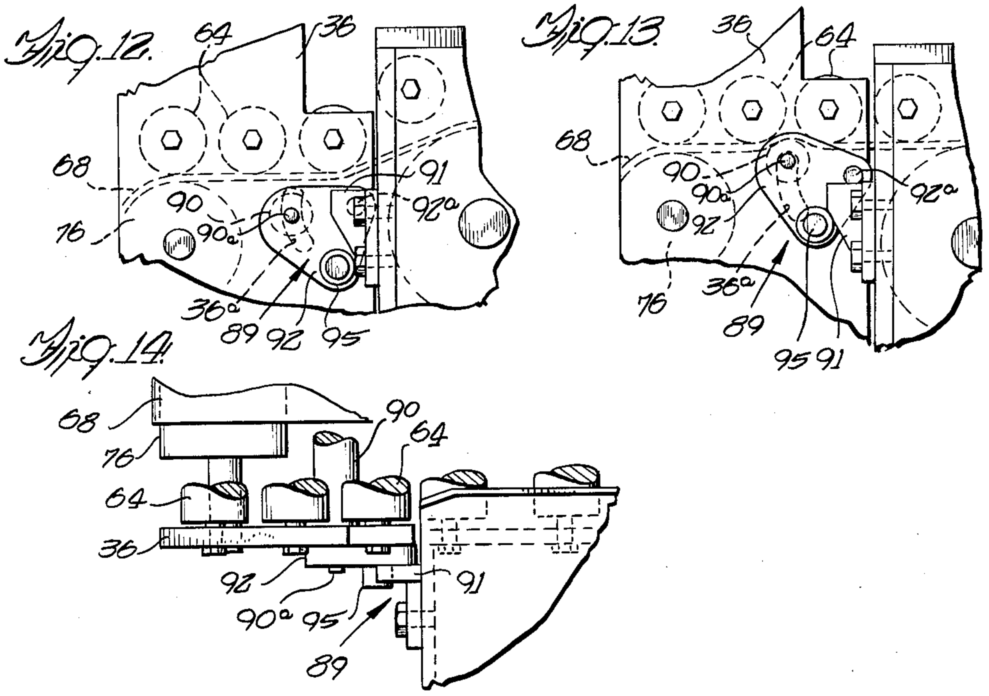
FIG. 12 is a fragmentary enlarged view similar to FIG. 2.
FIG. 13 is a view similar to FIG. 12 and showing the parts in different positions.
FIG. 14 is a fragmentary plan view of the mechanism shown in FIGS. 12 and 13.

When the elevator is in the lowered position the top of the drive roller 69 (FIG. 5) is above the top of the roller 76 of the elevator adjacent the unit engaging rollers 44 so that the belt 68 is urged against the unit engaging rollers 64 as shown in FIG. 2 to impart movement to units on the rollers. Because the drive roller 69 is in a fixed position and the rollers 64 move upwardly relative to the drive roller when the elevator C is raised, the belt 68 will tend to disengage the rollers 64 as an incident to such raising. However, a camming mechanism 89 rotates a pressure roller 90 into engagement with the belt 68 so as to rotate the unit engaging rollers 64 when the elevator is fully raised. The pressure roller 90 parallels the unit engaging rollers 64 and is supported beneath the belt 68 for movement toward and away from the belt. Thus, trunnions 90*a* on the pressure roller extend through holes 36*a* in the elevator side plates 36 and the journaled at opposite ends on arms 92 located on the outer sides of the side plates and fulcrumed thereon at 92*a* to swing about a horizontal axis to shift the pressure roller toward and away from the belt, the holes 36*a* providing clearance for the trunnions. The camming mechanism 89 consists of cam plates 91 mounted on the foldover conveyor frame 46 and having camming surfaces facing downwardly and rearwardly so as to engage follower pins 95 on the arms 92. As the elevator C rises, the arms 92 pivot upwardly about the fulcrum 92*a* as shown in FIG. 13 to swing the pressure roller 90 into engagement with the belt 68 and force the belt against the unit engaging rollers 64 so as to rotate the rollers and move units off the elevator. When the elevator is lowered as shown in FIG. 12, the arms 92 and pressure roller 90 drop to a lower position out of engagement with the belt 68.

The frame 46 of the foldover conveyor D consists of spaced side plates 96 between which unit supporting rollers 98 extend. These rollers are rotated by a belt 99 which extends over the same drive roller 69 that drives the belts 68 of the elevator. The belt 99 passes over a roller 100 adjacent the unit supporting rollers 98 at the forward end and passes over guide rollers 101. The belt extends down between these rollers 101 and over an adjustable tensioning roller 102 mounted to brackets 104 which move in slots 105 in the side plates 96. Tension is provided by adjusting screws 106, extending over brackets 108 attached to the side plate 96, these screws engage the tensioning roller 102 holding the roller down in a tensioning position.

Figure 7:
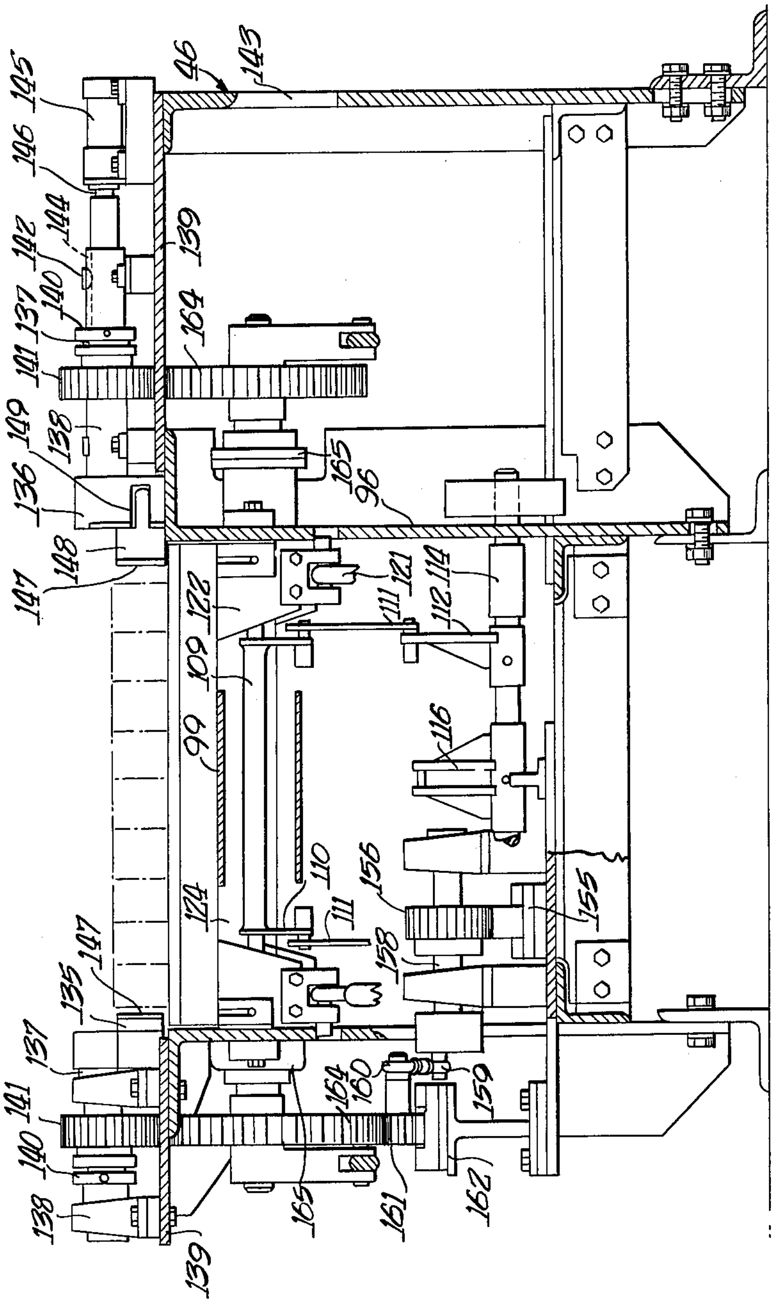
FIG. 7 is a view similar to FIG. 6 taken along line 7—7 of FIG. 5 and partially broken away.

The belt 99 is held in a roller driving position by pressure rods 107 mounted in brackets 113 attached to the frame 46. These rods 107 are spaced along the belt 99 except near the foldover arms 135 and 136. A pressure roller 109 is mounted adjacent the arms 135 and 136 and is secured to pivot plates 110. These pivot plates 110 are pivoted in bearings on side plates 96 of the frame 46. Links 111 are pivotally connected to the plates 110 and extend to a first pair of drive arms 112 on a shaft 114. The shaft 114 is mounted for rotation in brackets 115 secured to the side plates 96. A drive arm 116 mounted on the shaft 114 is pivotally connected to a drive piston 118 driven by a pivotally mounted cylinder 119. When the piston is moved outwardly from the cylinder the connecting linkage will operate the pressure roller 109 away from the belt 99 thereby removing the drive from the adjacent unit supporting rollers 98 and when the drive piston 118 is moved into the cylinder 119 the pressure roller 109 will be moved against the belt 99, thereby causing the rollers 98 to rotate and move units thereon. A second pair of drive arms 120 on the shaft 114 operate, by links 121, a forward stop plate 122 mounted between the side plates 96 and movable into the path of units on the rollers 98. As seen in FIG. 7 the plate is shaped with a recess 124 to accommodate the belt 99 when the plate is in the lowered position. When in this lowered position the top of the plate is below the level of the rollers 98 and does not interfere with movement of units on the rollers. Since the linkage for raising the stop plate 122 is inter-connected with the same cylinder 119 that operates the pressure roller 109, it is seen that the stop plate will only rise when the pressure roller has been lowered. An alternate stop plate 125 may be mounted similarly to the stop plate 122 in an alternate position for use with the same linkage to accommodate a different size unit.

A rear stop plate 126 is mounted similarly to the forward stop plate 122 and is operated by a cylinder 128 whose piston 129 operates an arm 130 on a shaft 131 that extends across and is secured to the side plates 96. A pair of arms 132 on the shaft 131 are pivotally connected to a link 134 which in turn is pivotally connected to the rear stop plate 126. Thus when the cylinder 128 is operated the stop plate 126 will be raised or lowered. The stop plate 126 is shaped similarly to stop plate 122 with a similar recess to accommodate the belt.

A pair of foldover arms 135 and 136 are mounted on the top of the side plates 96 and straddle the unit supporting rollers 98. These arms are attached to shafts 137 for rotation thereon. The shafts 137 are mounted in bearings 138 on top platform 139 of the frame 46 of the foldover conveyor, each shaft being mounted in two bearings 138. Intermediate the bearings 138 and mounted on the shaft 137 is a connector 140 engageable and disengageable with a pinion 141 which will be described later. One of the shafts 137 is laterally movable in its associated bearings and is rotatable with the connector 140 by a key 142 in the connector slideable in the keyway 144 of the shaft. This shaft is movable laterally by the operation of a cylinder 145 which moves a piston 146 connected to the shaft. When the cylinder is operated to move the shaft 137 and associated foldover arm 136 in the direction of the other foldover arm 135, the arms are capable of clamping a unit or row of units such as brick therebetween. The foldover arm 136 which moves to perform the clamping operation has an adjustably mounted head portion 148 which is pivotally mounted in a recess on the arm 136 and is adjusted by adjusting screws 150 to vary the vertical plane of the head for proper alignment. Resilient pads 147 are attached to the faces of the arms for engagement with the units.

The pinions 141 mounted on each shaft 137 drive the shaft through the connector 140 and when the connector is disengaged, rotation of the pinion will not be transmitted to the shaft. The pinions are operated by a horizontal foldover cylinder 151 mounted at the bottom of the frame 46 and having a piston 152 movable therein. A horizontal rack 154 is attached to the piston 152 and moves in gibs 155. The rack 154 engages a first pinion keyed to a shaft 158. This shaft has an arm 159 fixed thereto which is connected by a pivotal link 160 to a second rack 161 also movable horizontally in gibs 162. This second rack 161 engages a bull gear 164 mounted on a shaft 165, extending across the frame 46 through bearings 165 in the side plate 96 for mounting a similar bull gear 164 for engagement with the pinion 141 on the other of the shafts 137. The bull gears 164 rotate the pinions 141 through an arc of approximately 180°, thereby rotating the holdover arms 135 and 136 through an arc of approximately 180°. The above described foldover drive mechanism imparts movement to the arms such that the velocity is initially zero and increases to a maximum, subsequently decreasing to zero so that when a row of units is clamped between the arms and folded over by rotation of the arms, the arms will slow down to a zero velocity just before unclamping and depositing the row on the subsequent row, thus avoiding damage to the product.

Mounted above the unit supporting rollers 98 and in front of the foldover arms 135 and 136 is an upward extension 166 of the frame 46. This extension 166 has a crosspiece 168 upon which are mounted the pushers F.

The pushers consist of three rods 169 secured to the crosspiece 168 and extending forwardly therefrom. A pusher carriage 170 is mounted on these rods 169 for lateral movement. A pusher plate 171 is pivotally secured to the ends of a pair of pusher arms 172 rotatably mounted in bearings 174 on the two rods 169 directly above the unit supporting rollers 98. One of the arms 172 forms part of a bell crank 175. The other arm 176 of the bell crank 175 is pivotally secured to a piston 178 that moves in a cylinder 179 mounted on the crosspiece 168 parallel to the rotation of the pusher arms 172. This cylinder 179 is operable through the bell crank 175 to rotate the pusher plate from a lower unit engaging position as seen in solid lines in FIG. 10 to a raised unengaging position shown in dot-dash lines in FIG. 10. The pusher plate 171 is laterally adjustable in a bracket 180 by adjusting rods 181 secured to the pusher plate 171 and adjustable in the bracket 180 by lock nuts 183.

The pusher carriage 170 is movable in the direction of movement of units and is driven on the rods 169 by a pair of lever arms 182 pivotally attached to the sides of the pusher carriage 170. These levers 182 are pivotally secured to a pivoted link 184 that is pivoted in a bracket 185 attached to the frame 46 intermediate its ends. The other end of the rotating link 184 is pivotally attached to a horizontal link 185 that is pivotally connected to an arm 186 on the bull gear 164. Thus when the bull gear is rotated the inter-connecting linkage will force the pusher carriage 170 to move laterally on the rods 169, the linkage being such that when the bull gear is rotated to fold over a row of units the pusher carriage 170 will move away from the upward extension 166 of the frame 46 and when the foldover arms 135 and 136 are returned to the initial position the pusher carriage 170 will return to its initial position adjacent the upward extension 166.

Figure 8:
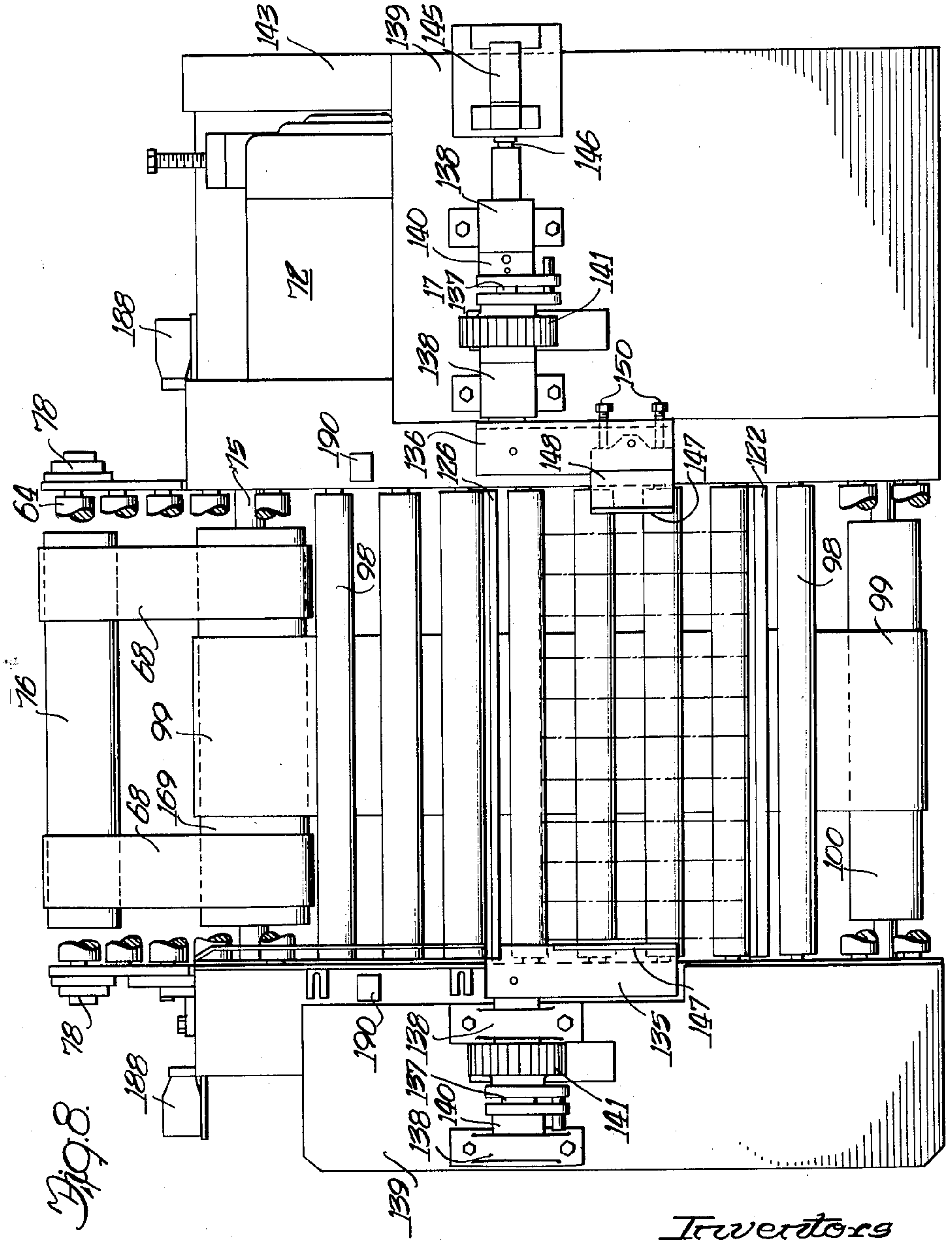
FIG. 8 is a top plan view of structure of FIG. 5.
Figure 9:
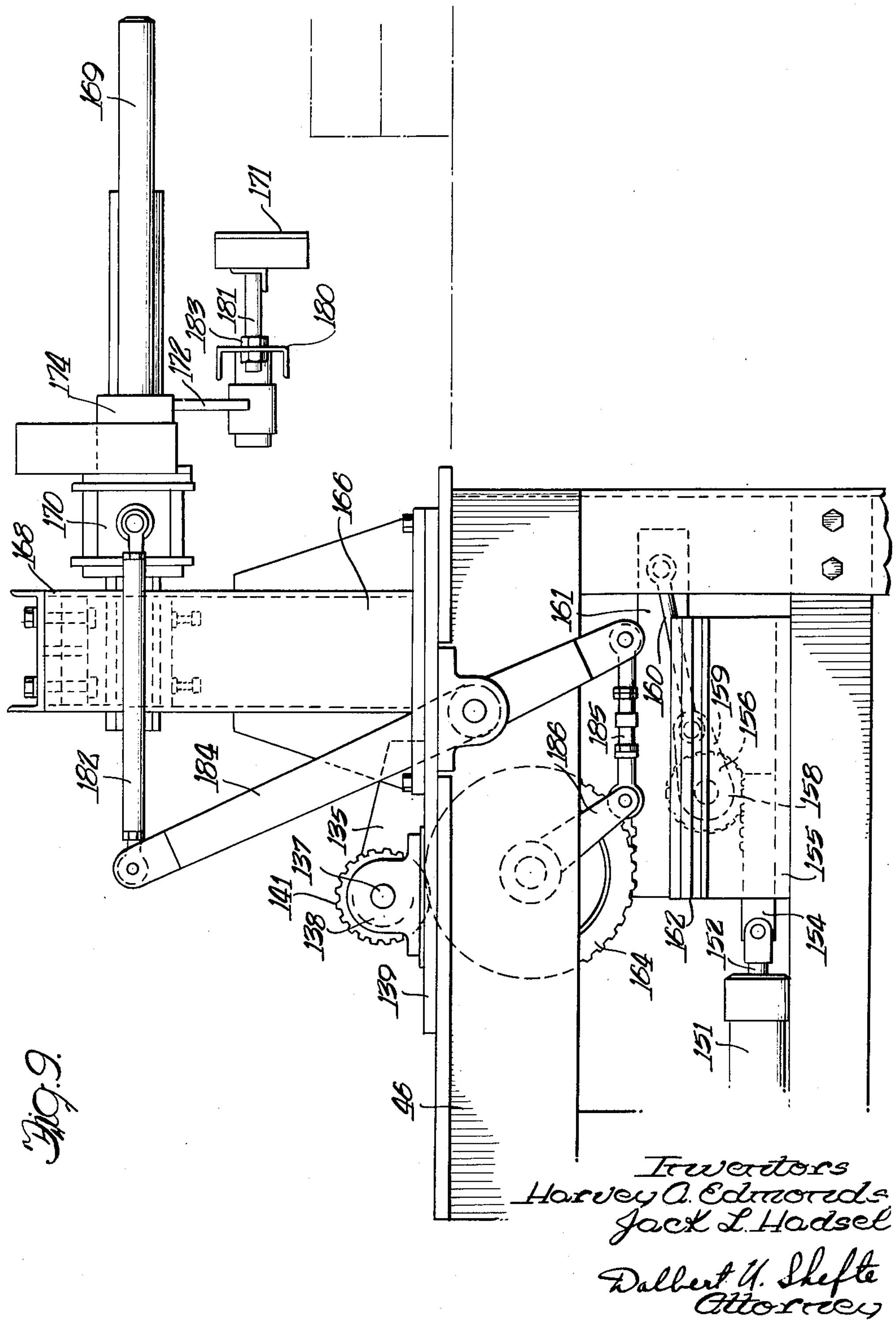
FIG. 9 is a side elevation of the foldover arms, foldover drive mechanism and pusher of the present embodiment with the foldover conveyor structure omitted for clarity.

The arrangement of switches which are shown diagrammatically can best be explained by following the operation of the accumulator and foldover device of the prsent invention. As rows of units are fed from the feed conveyor A onto the accumulator B the rollers 15 of the accumulator conveyor convey the rows of units onto the elevator C. When a row of units is fully on the elevator rollers 64, a light beam extending between light and photo-electric cells 188 mounted on the side plates 36 of the elevator (FIG. 8) is interrupted signaling the operation of the elevator raising cylinder 55. When the elevator rises, the pivotal carriage 26 is lowered, removing the drive from the rollers 15, thereby stopping the movement of rows of units on the accumulator conveyor until the elevator has returned to its lowered position.

Figure 10:
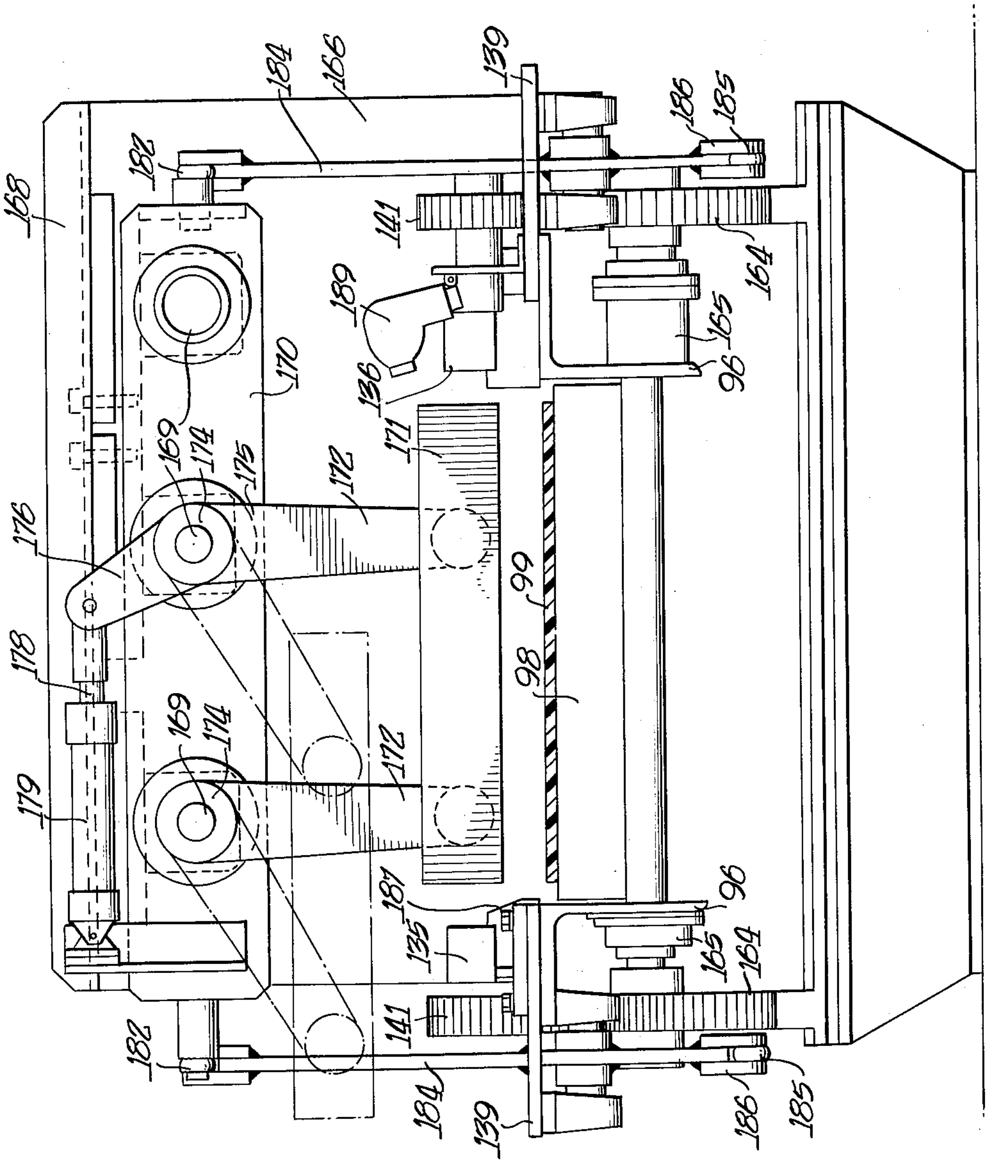
FIG. 10 is a front elevational view of the pusher apparatus of FIG. 9.
Figure 11:
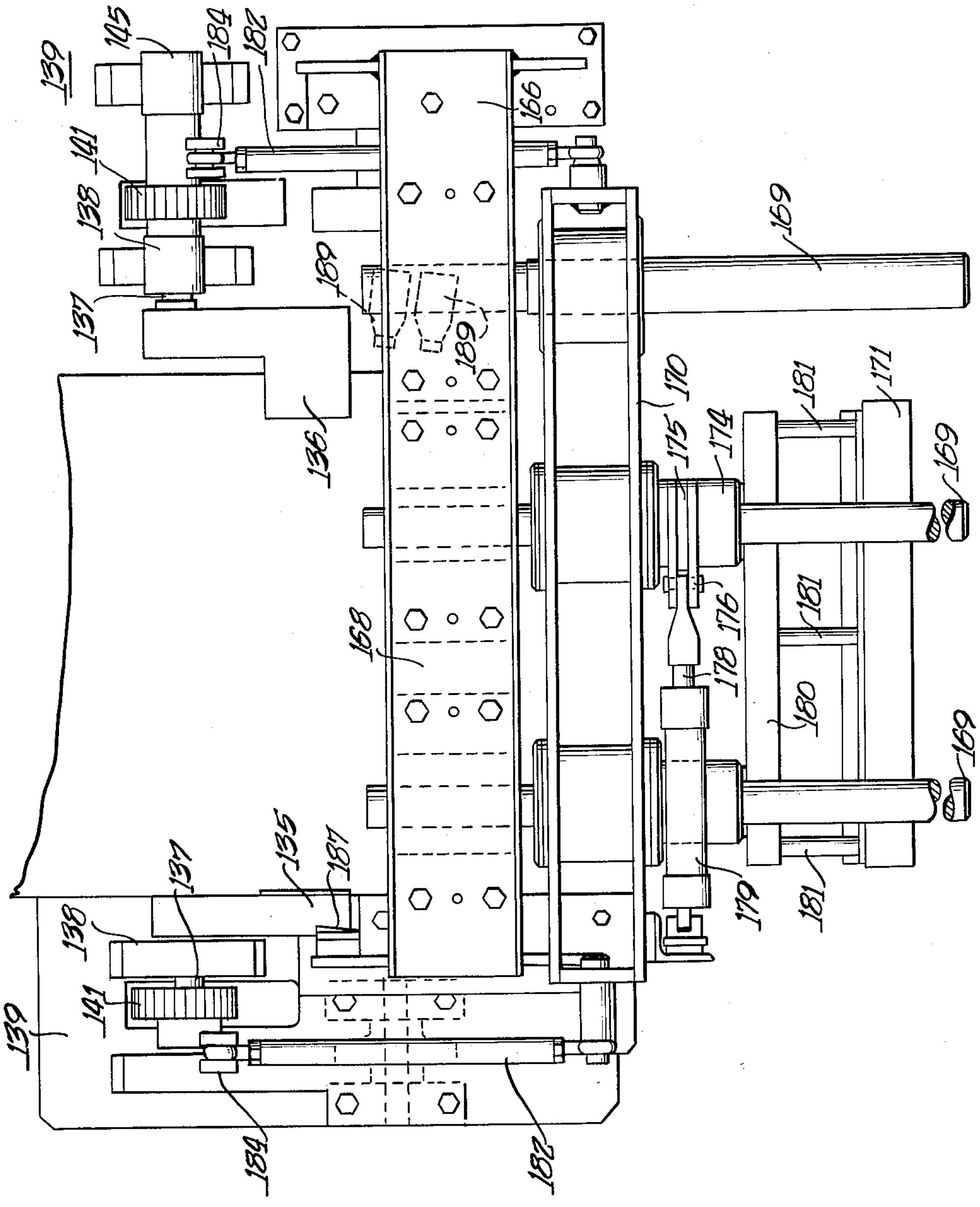
FIG. 11 is a top plan view of the pusher apparatus of FIG. 9.

As the elevator is rising, the elevator drive belt 68 disengages the roller 64 until the elevator is in the raised position and the camming mechanism 89 has forced the pressure roller 90 against the belt 68 to resume rotation of the rollers 64 to move the row of units off the elevator onto the foldover conveyor. The rear stop plate 126 is initially in the lowered position thereby permitting the row of units to pass by unobstructed. However, the forward stop plate 122 is initially in the raised position and stops the first row of units so as to be in position for clamping by the foldover arms 135 and 136. In this position the pressure roller 109 is not driving the belt 99. When the first row of units is stopped by the forward stop plate 122, this row interrupts a light beam extending between light and photo-electric cells 189 on one side of the frame 46 and reflected by a mirror 187 on the other side of the frame (FIGS. 10 and 11). Through suitable electrical control circuits well known in the art, the interruption of this beam signals the operation of the clamping piston 146 to clamp the row between the foldover arms 135 and 136 and also signals the operation of the mechanism for raising the rear stop plate 126. When the pressure in the cylinder 145 is sufficient to firmly clamp the units, a pressure sensing switch (not shown) actuates the foldover cylinder 151 to rotate the foldover arms 135 and 136. However, in order for this to occur, a light beam from light and photo-electric cells 190 (FIG. 8), cast across the rear of the frame 46 must be interrupted by a second row of units.

When the first row of units is folded over onto the second row, a switch is actuated which operates the cylinder 145 to unclamp the top row of units and also operates the cylinder 119 to lower the forward stop plate 122 and press the pressure roller 109 against the belt 99 for subsequent movement of the double tier units along the conveyor D. Simultaneously the foldover arms are returned to their initial position.

The lowering of the rear stop plate 126 is controlled by a switch which may be located as desired. When the apparatus of this invention is used in the packaging line referred to above, a length of paper is fed by the paper feed mechanism G onto the second row of units prior to the foldover of the first row of units and a cutting blade operates to cut the paper after the paper is held between the rows. As the cutting blade returns it actuates a switch which operates the cylinder 128 to lower the rear stop plate 126 thereby permitting the double tier row of brick to be conveyed past the pusher F.

The lateral movement of the pusher F is linked to the operation of the foldover mechanism F as described above and the cylinder 179 is operable simultaneously with the foldover operation so that as the arms 135 and 136 are folded over, the cylinder 179 pivots the pusher plate 171 down into engaging position and simultaneously the pusher carriage 170 is moved forward to push the double tier row to the next operation such as a strapper H.

When the foldover arms 135 and 136 return the pusher plate 171 is swung to its initial position and the pusher carriage 170 returns to its rearward position.

From the above it is apparent that the present invention provides an automatically operable mechanism for accumulating rows of units, controlling the release of rows, folding one row over on another, and discharging the double tier stack from the apparatus. The apparatus is compact and utilizes a minimum number of operations to perform the desired functions.

We claim as our invention:

1. An accumulator and foldover apparatus comprising: a supporting framework; a feed conveyor mounted on said supporting framework for conveying rows of units; an accumulator section mounted on said supporting framework adjacent said feed conveyor for receipt of rows of units from the feed conveyor; releasing means associated with said accumulator section for releasing rows of units singly from the accumulator section; a discharge conveyor mounted on said supporting framework adjacent said accumulator section for receiving rows of units released by said releasing means and conveying said rows away therefrom; means for folding over a row of units on the discharge conveyor onto a subsequent row of units to form a double tier stack of units.

2. An accumulator apparatus comprising: a supporting framework; a feed conveyor mounted on said supporting framework for conveying rows of units; an accumulator section mounted on said supporting framework adjacent said feed conveyor for receipt of rows of units from the feed conveyor; an elevator movably mounted in said framework and having a receiving position adjacent the accumulator conveyor for receipt of a row of units therefrom and having a raised discharge position; means for raising and lowering said elevator; a discharge conveyor mounted on said supporting framework adjacent the discharge position of said elevator for receiving rows of units discharged from said elevator and conveying said rows away therefrom; foldover clamps pivotally mounted on said supporting structure superjacent the discharge conveyor and engageable with a row of units to clamp and fold the row over upon another row; means for operating said clamps.

3. An accumulator and foldover apparatus, comprising: a supporting framework; an accumulator conveyor mounted on said supporting framework; drive means engageable with said accumulator conveyor for operation of the conveyor to transport units thereon; an accumulator elevator movably mounted on said supporting framework from a unit receiving position adjacent the accumulator conveyor to a discharge position; means for raising and lowering said elevator; said drive means for the accumulator conveyor being interconnected to the elevator, said elevator causing the drive means to move out of engagement with the accumulator conveyor when the elevator moves from the unit receiving position and moves into engagement when the elevator returns; a discharge conveyor mounted on said supporting framework adjacent the discharge position of said elevator for receiving rows of units discharged from said elevator and conveying said rows away therefrom.

4. An accumulator apparatus, comprising: a supporting framework; a unit transporting member movably mounted on said supporting framework for transporting units thereon; drive means pivotally secured to said supporting framework and movable into driving engagement with said transporting member; a releasing elevator movably mounted in said supporting framework; means for moving said releasing elevator from a receiving position adjacent the transporting member to a releasing position; said drive means being interconnected with said elevator to move out of driving engagement with the transporting member when the elevator moves from the receiving position to the releasing position and movable into driving engagement wtih said transporting member when the elevator returns to the receiving position.

5. A foldover apparatus for clamping units and folding the units over, comprising: a supporting framework; a pair of spaced shafts rotatably mounted in line on said supporting framework; a pair of opposing clamping arms secured to said shafts for movement therewith; means for laterally moving one of said shafts toward the other shaft so as to move one of said arms toward the other arm into a unit clamping position; pinions mounted on said shafts for rotation therewith; a single gear shaft rotatably mounted on the supporting framework; bull gears fixedly mounted on said single gear shaft for rotation therewith, said bull gear engaging said pinions to transmit rotation thereto; a rack mounted for linear motion in said supporting framework and in engagement with one of said bull gears; drive means for reciprocally moving said rack, thereby transmitting rotation to both clamping arms which move from a clamping position through a foldover stroke to a releasing position and subsequently through a return stroke.

6. The foldover apparatus of claim 5 wherein the drive means includes a drive cylinder and a drive piston, said piston being linked to said rack and reciprocating in said cylinder.

7. A foldover apparatus for use in a conveyor system, the foldover apparatus comprising: a supporting framework; a unit conveying section mounted on said supporting framework; drive means for operating said conveying section to move units through the foldover apparatus; a pair of opposing foldover clamps rotatably mounted on said supporting framework, one of said clamps being laterally movable toward the other clamp to clamp units therebetween; means for reciprocally rotating said clamps; means for laterally moving the one clamp toward the other clamp; a first stop member mounted on the supporting framework and movable into the path of units moving on said conveying section; means for moving said first stop member to a position adjacent said clamps to stop units at a position between said clamps for subsequent clamping and folding over; a second stop member mounted on the supporting framework and movable into the path of units moving on said conveyor section; means for moving said second stop member to a position in which it will stop units so that the unit folded over by the clamps will be deposited on said stopped units.

8. An accumulator and follower apparatus comprising, in combination, a supporting framework, an accumulator conveyor mounted on said supporting framework, drive means for said accumulator conveyor operable when actuated to advance the conveyor to transport units thereon, an accumulator elevator movably mounted on said supporting framework from a unit receiving position adjacent the accumulator conveyor to a discharge position, means for raising and lowering said elevator, said drive means for the accumulator conveyor being responsive to the movements of said elevator and actuated for causing the accumulator conveyor to remain stationary when the elevator moves from the unit receiving position and to advance when the elevator returns to such position, and a discharge conveyor mounted on said supporting framework adjacent the discharge position of said elevator for receiving units discharged from said elevator and conveying such units away from the elevator.

9. An accumulator and foldover apparatus comprising, in combination, a supporting framework, an accumulator conveyor mounted on said supporting framework, drive means for said accumulator conveyor operable when actuated to advance the conveyor to transport units thereon, an accumulator elevator movably mounted on said supporting framework from a unit receiving position adjacent the accumulator conveyor to a discharge position, means for raising and lowering said elevator, said drive means for the accumulator conveyor being responsive to the movements of said elevator and actuated for causing the accumulator conveyor to remain stationary when the elevator moves from the unit receiving position and to advance when the elevator returns to such position, a discharge conveyor mounted on said supporting framework adjacent the discharge position of said elevator for receiving units discharged from said elevator and conveying such units away from the elevator, and drive means for said discharge conveyor rendered effective to advance the conveyor in timed relation to movement of said elevator into said discharge position and to stop the conveyor when the elevator moves out of the position.

10. An accumulator apparatus comprising, in combination, a supporting framework, a unit transporting member movably mounted on said supporting framework for transporting units thereon, drive means mounted on said supporting framework and connected to said transporting member to move the same when the drive means is actuated, a releasing elevator movably mounted in said supporting framework, and means for moving said releasing elevator from a receiving position adjacent the transporting member to a releasing position, said drive means being responsive to movement of said elevator and operating to stop movement of said transporting member when the elevator moves from the receiving position to the releasing position and to move said transporting member when the elevator returns to the receiving position.

11. In apparatus for clamping units and folding the units over, the combination of a supporting framework, a pair of opposing clamping arms mounted on said framework to rotate about a common axis and spaced apart along such axis to receive work units between them, means for moving at least one of said arms along said axis and toward the other arm and into clamping engagement with units between the arms, drive means mounted on the supporting framework and connected to said clamping arms to rotate both clamping arms together and swing the arms in unison from a clamping position through a foldover stroke to a releasing position and subsequently through a return stroke, and stop elements mounted on said framework for movement into and out of a path of said units between said arms and movable in timed relation to movement of the arms to position successive rows of units along said path for the placing of one row onto another row by the arm.

References Cited in the file of this patent

UNITED STATES PATENTS

| | | |
|---|---|---|
| 1,401,429 | Moone | Dec. 27, 1921 |
| 1,437,547 | Pope | Dec. 5, 1922 |
| 1,609,802 | Ekstrom | Dec. 7, 1926 |
| 2,130,323 | Lueckel | Sept. 13, 1938 |
| 2,303,186 | Williams | Nov. 24, 1942 |
| 2,528,865 | Dale | Nov. 7, 1950 |
| 2,609,917 | Gotthardt | Sept. 9, 1952 |
| 2,667,259 | Parker | Jan. 26, 1954 |
| 2,755,907 | McCullough | July 24, 1956 |
| 2,785,785 | Macaluso | Mar. 19, 1957 |
| 2,818,156 | Edwards | Dec. 31, 1957 |
| 2,889,912 | Franklin | June 9, 1959 |